Figure 1:
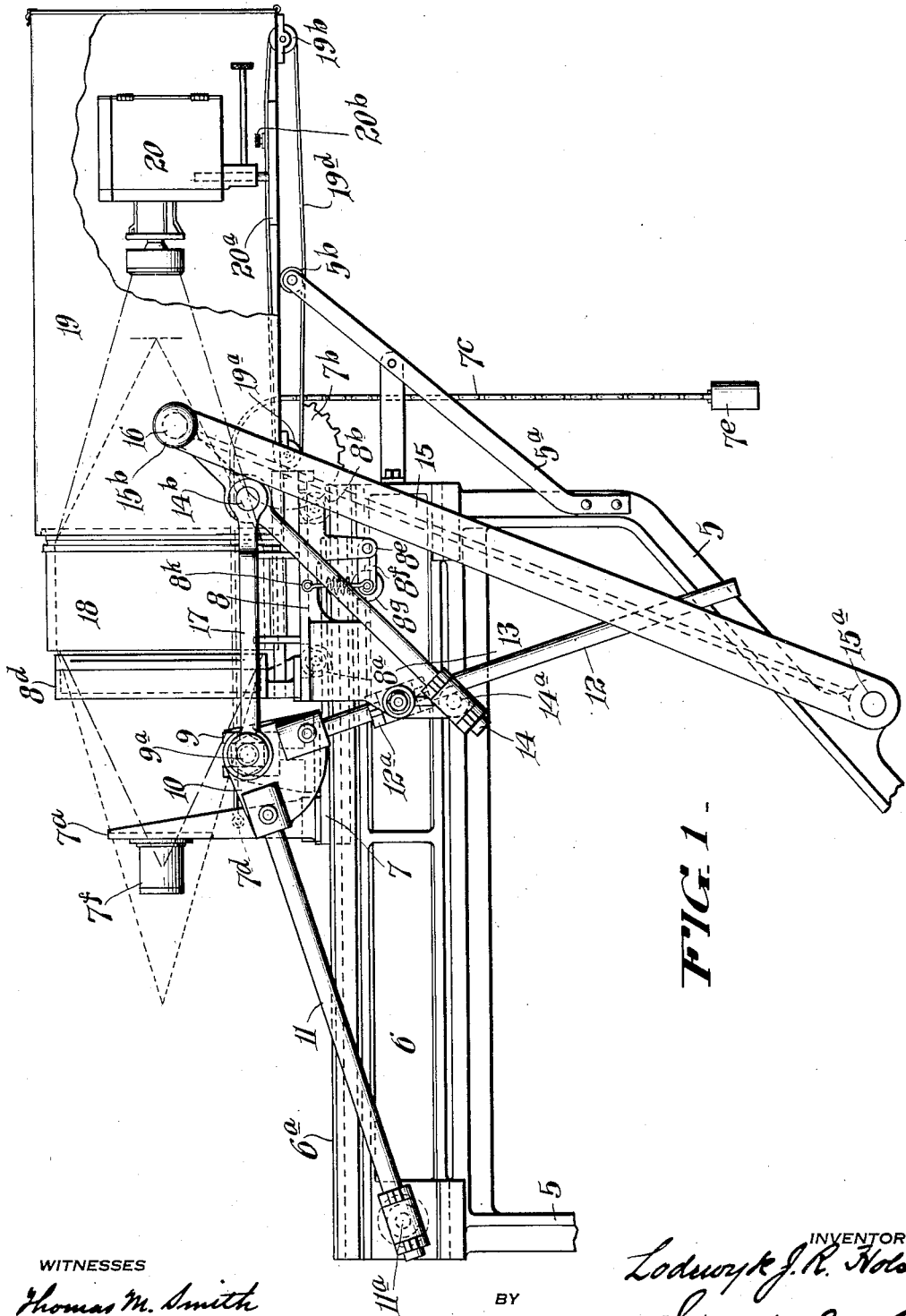

L. J. R. HOLST.
MEANS FOR MECHANICALLY FOCUSING PHOTOGRAPHIC LENSES.
APPLICATION FILED OCT. 30, 1911.

1,029,297.

Patented June 11, 1912.

4 SHEETS—SHEET 1.

WITNESSES
Thomas M. Smith
Helen F. Miller

INVENTOR
Lodewyk J. R. Holst,
BY
J. Walter Douglas.
ATTORNEY

L. J. R. HOLST.
MEANS FOR MECHANICALLY FOCUSING PHOTOGRAPHIC LENSES.
APPLICATION FILED OCT. 30, 1911.

1,029,297.

Patented June 11, 1912.

4 SHEETS—SHEET 2.

*FIG. 2.*

WITNESSES
Thomas M. Smith
Helen F. Miller

INVENTOR
Lodewyk J. R. Holst
BY
J. Walter Douglas
ATTORNEY

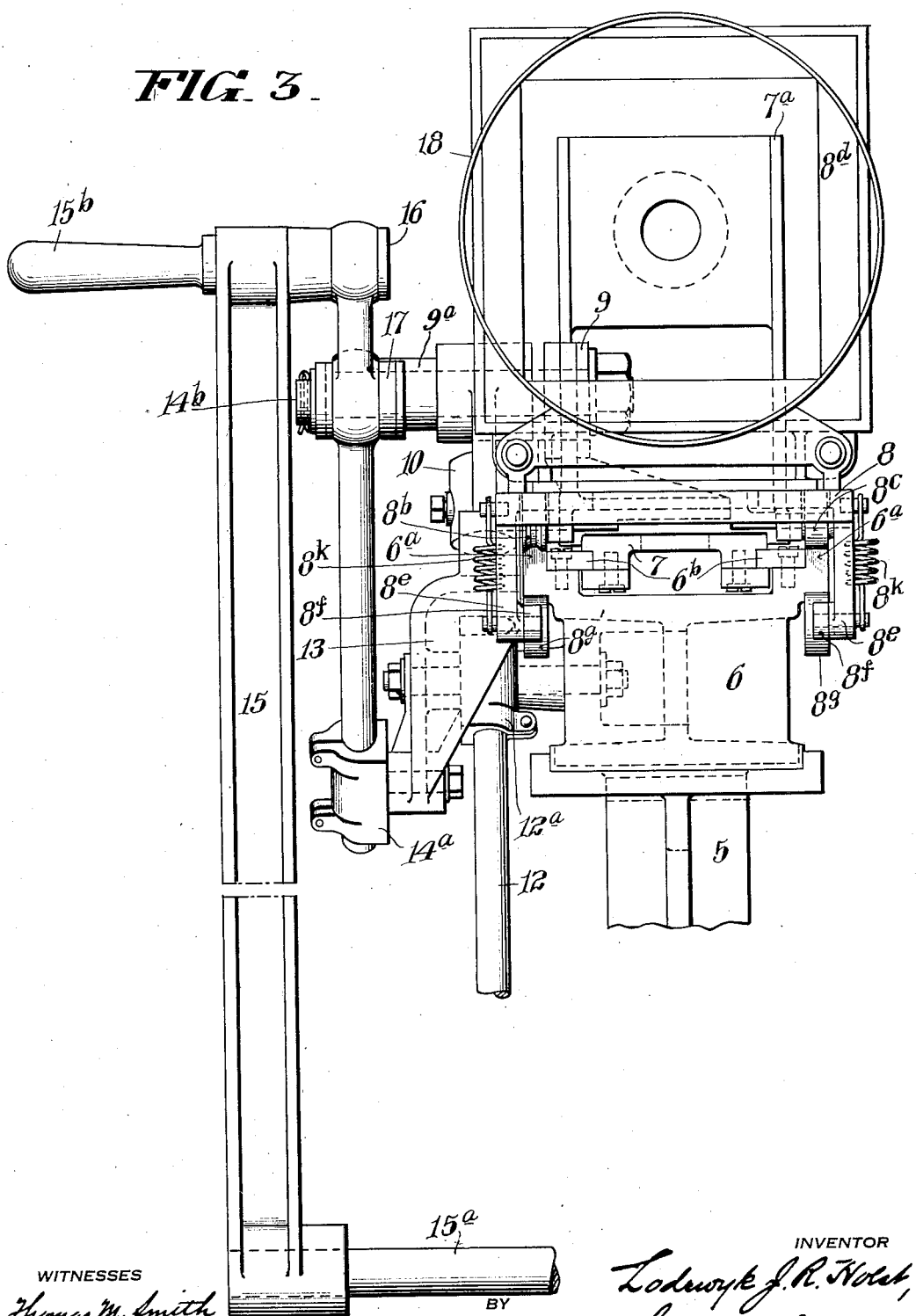

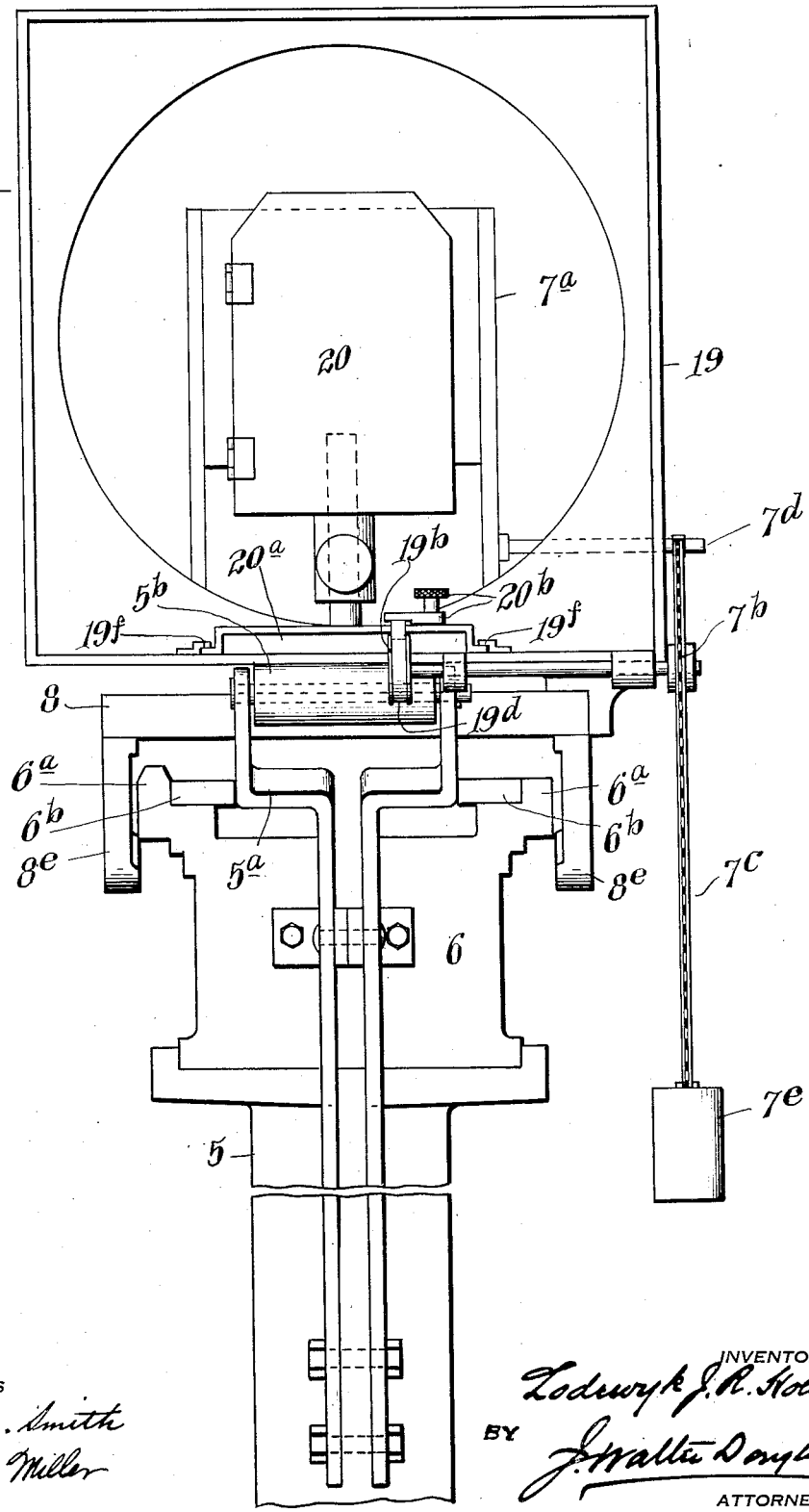

UNITED STATES PATENT OFFICE.

LODEWYK J. R. HOLST, OF LANSDOWNE, PENNSYLVANIA, ASSIGNOR TO WILLIAMS, BROWN AND EARLE, INC., OF PHILADELPHIA, PENNSYLVANIA, A CORPORATION OF PENNSYLVANIA.

MEANS FOR MECHANICALLY FOCUSING PHOTOGRAPHIC LENSES.

1,029,297. Specification of Letters Patent. Patented June 11, 1912.

Application filed October 30, 1911. Serial No. 657,633.

*To all whom it may concern:*

Be it known that I, LODEWYK J. R. HOLST, a citizen of the United States, residing at Lansdowne, in the county of Delaware and State of Pennsylvania, have invented certain new and useful Improvements in Means for Mechanically Focusing Photographic Lenses, of which the following is a specification.

My present invention is based in principle upon the art of mechanically focusing photographic lenses forming the subject-matter of an application for United States Letters Patent, Serial No. 640,902, filed by me under date of July 27th, 1911, in which the focusing of photographic lenses is predicated upon mechanically establishing and automatically maintaining true conjugate-foci of a lens with respect to an object and the image projected by such lens through mechanically utilizing the geometrical property of a rectangular triangle that by shifting the apex in a line parallel to the hypotenuse as the base the consecutive foot-points of the perpendicular from the apex on the hypotenuse divide the latter in sections to which the length of the perpendicular is middle proportionate, establishing thereby distances which bear to each other the same mathematical relation as the principal focus bears to the conjugate-foci, diminished by the focus, and which relations are maintained in all positions of the apex when shifted parallel to the hypotenuse; and my present invention in particular, embodies mechanisms for carrying into effect the said aforementioned application.

The nature, scope and characteristic features of my present invention will be more fully understood from the following description taken in connection with the accompanying drawings forming part hereof, in which—

Figure 1, is a longitudinal side elevational view of the focusing mechanism, showing in part a stand or bracket for its support. Fig. 2, is a plan view of Fig. 1, the lens illuminating device and plate carriers, being removed. Fig. 3, is an end elevational view in which the lamp-house, is removed; and Fig. 4, is an end elevational view with the lamphouse in position, and the rear door thereof, removed.

Referring to the drawings with reference particularly to Fig. 1, 5 is the stand or bracket upon which the mechanism is held in position. On it is placed the support or frame part 6, which is provided with two sets of guide ways, formed preferably by the outer edges $6^a$ of the bed proper, and by parallel strips $6^b$ projecting inwardly from the sides of the frame as clearly shown in Fig. 3. The inwardly projecting guide ways support a slide 7, which carries on its forward end the lens support $7^a$, and directly behind that a bracket 9, supporting a transversely projecting pivot-pin $9^a$, as clearly shown in Fig. 2. This slide 7 will be referred to as the lens-slide. On the guide ways $6^a$ formed by the top of the frame 6, a carriage 8 is mounted; two grooved wheels $8^a$ and $8^b$, and one flat rimmed wheel $8^c$, placed on the opposite guide ways (Fig. 2) permitting this carriage to be easily moved back and forth over the frame 6. The carriage 8, is provided on either side with a downwardly projecting arm $8^a$, from which pivoted arms $8^f$ project forwardly, to support flat rimmed-rollers $8^g$ and $8^a$ which are pressed against the bottom surfaces of the guide ways $6^a$ by means of springs $8^h$. On its top surface, the carriage 8, supports the plate or object carrier $8^d$, behind which the usual condenser 18, is placed. This carriage will further be referred to as the plate-carriage. The forward end of the lamphouse 19, is slipped over the condenser casing to assure a light-tight connection between these parts. The lamphouse projects beyond the rear end of the carriage and is supported on a roller $5^h$, pivoted on a suitable bracket $5^a$, attached to the stand 5. This arrangement permits of moving the lamphouse back and forth with the condenser, whereas the illuminating device 20, which may be of any convenient kind or type, is independently adjustable with regard to the condenser or object-plate by the device now to be described.

I am aware that it has been proposed to attach the illuminating device to the plate carrier to cause it to move in unison with the object plate and the condenser, and although this arrangement is suitable for focusing mechanisms having a comparatively small range of adjustment, I find that in constructions as these now being described, and which are capable of a wide range of adjustments, giving both enlargements and reductions, the lens assumes such widely different positions with relation to the condensers, that it is desirable to provide means whereby the illuminating device is caused to be adjusted in harmony with the lens-movement, and not kept at a fixed distance behind the object.

The bottom surface of the lamphouse 19, supports in convenient positions the chain wheels 19$^a$ and 19$^b$, (Figs. 1 and 4), which partly project inside the lamphouse through suitable slots. The spindle of the chain wheel 19$^a$ is prolonged to support also the larger chain wheel 7$^b$. A chain 7$^c$ passes over this wheel and is attached to a suitable pin 7$^d$, projecting outwardly from the lens support 7$^a$, and a suitable weight 7$^e$, is suspended from the free end of this chain. The small chain wheels 19$^a$ and 19$^b$, are connected by an endless chain 19$^d$, which passes over the base 20$^a$, slidably adjustable over the bottom of the lamphouse 19, between suitably shaped guiding strips 19$^f$. A clamp-plate and screw 20$^b$, when tightened down, attach the base 20$^a$, to the endless chain 19$^d$. It is thus evident that when the distance between the lens and the object is increased the illuminating device is caused to approach the condenser 18, and that when lens and object move toward each other the action of the weight 7$^e$ will cause the illuminating device to recede from the condenser. The relative diameters of the wheels 19$^a$ and 7$^b$, depend upon the relation of the focal lengths of the lens and condensers used, and may be determined most easily by actual experiment, as the uncorrected optical properties of condensers make computation too uncertain and complicate.

In Fig. 1, the dot and dash lines indicate the path of the light from the illuminating device 20, through the condenser 18, to the lens 7$^f$, the apex of this bundle of light coinciding with the focal point of the lens 7$^f$, when the latter is moved in the position of its nearest approach to the condenser 18, while the dotted lines indicate that when the lens is moved farther apart from the condenser 18, to coincide with the apex formed by these lines, the illuminating device 20, is moved toward the condenser into its proper corresponding position.

Near the forward end of the frame 6, an oscillatory slide block 11$^a$ is provided. This is later referred to as the fulcrum. A similar slide block 12$^a$ is supported by a bracket 13, attached to the carriage 8, and forms the driving point for this carriage. These slide blocks are engaged by a pair of guide rods 11 and 12, which are accurately and rigidly held at right angles to each other in the angle plate 10, which is pivoted on the pivot 9$^a$, previously mentioned and forming the driving point of the slide. The center of the pivot-hole in the angle plate 10, coincides exactly with the intersection of the axes of the rods 11 and 12. A link rod 17, connects the pivot-pin 9$^a$, with the pivot-pin 14$^b$, intermediate the pivot-pin 16 and the slide block 14$^a$ of the lever 14. The slide block 14$^a$ is pivoted on the bracket 13, and the pivot-pin 16, is carried by the upper end of the operating lever 15, which in its turn is pivoted on the spindle 15$^a$ carried by the support 5. The coöperation of this system of levers causes the lens-slide 7, and the plate-carriage 8, to move with such relative velocity that the lens and object, respectively carried on these latter parts, at all times assume the proper relative positions to project a sharp image, either of increased, reduced or equal size as the original, on a stationary image receiving surface, suitably placed with relation to the other elements, in accordance with the theoretical conditions fully developed in my pending application for a United States Patent, Serial No. 640,902, filed by me July 27th, 1911.

The mode of operation of the focusing means as illustrated and described, is as follows:—First, the height of the pivot-pin 9$^a$, on which the two slide-rods 11 and 12, are suspended is adjusted so that the distance of its center, which forms the driving point of the lens-slide 7, above the line uniting the centers of the oscillating guides 11$^a$ and 12$^a$, of the slide-rods 11 and 12, is exactly equal to the principal focal length of the lens used; then the operating lever 15, is moved until the distances between the pivot-pin 9$^a$, and the centers of each of the oscillating guide block-bearings 11$^a$, and 12$^a$, that is, the fulcrum and the driving point of the plate-carriage are exactly equal. The centers of these three elements will then form an isosceles right-angle triangle; the base of which equals twice the focal length, as formerly established. With the mechanism in this adjustment, which is known as the unit-position, the image is adjusted at a distance equal to twice the focal length from the lens 7$^f$, measured from its first or outer nodal point, and in the present instance the image support will rest on a continuation of the support 6, not shown in the drawings. The object support is similarly adjusted measuring from the second or inner nodal point. The object support 8$^d$, is then firmly secured to the carriage 8, and the image-support is rigidly secured with relation to the supporting-frame 6, of the device. The mechanism then stands adjusted to produce an image equal in size to the object and is ready for operation by means of the crank-handle 15$^b$.

In moving the same toward the image, that is, to the left in Fig. 1, it will cause the lens to approach the image through the effect of the double-armed lever-rod 14, and the connecting-rod 17, acting on the lens-driving point 9ª, of the plate-slide 7. At the same time, the forward slide rod 11, will glide oscillatingly through its fulcrum 11ª, and assume a more upright position causing the other slide rod 12, to assume a correspondingly increased slanting position toward the horizontal and driving thereby the plate-carriage 8, farther away from the lens 7ᶠ, in which movement it is assisted by the action of the lower end of the double-armed lever-rod 14. The adjustments previously carried out cause the movement of the plate-carriage 8, with the object-support attached thereto, to remain continuously in proper relation to the movement of the lens-slide 7, supporting the lens 7ᶠ, so that the image will remain sharp, while constantly changing in size within the limits of the capacity of the mechanism.

Fig. 1, shows the mechanism in that limit of its adjustment which coincides with the maximum magnification for which the instrument is designed, and on moving the crank-handle 15ᵇ, toward the left, the lens and the object-plate will both move toward the image, the lens moving faster than the plate. This condition will prevail, until the position for reproduction in equal size has been reached, in which position the rods 11 and 12, make each an angle of 45°, with the imaginary line uniting the centers of the oscillatory guide blocks 11ª and 12ª. On continuing the movement of the crank-handle 15ᵇ, in the same direction, beyond this point, the lens will continue in its course toward the image, but the object-plate will now begin to retrace its former course, increasing thereby not only the distance between the plate and the lens, but also between the plate and the image, all of which is in full accordance with the mathematical requirements of the equivalent foci. The continued movement of the handle 15ᵇ, causes thus the lens and the plate to first move in the same direction and later in opposite direction or vice versa, whereas the handle 15ᵇ, moves in the same direction from end to end of its course. It should furthermore be observed, that inasmuch as the focusing mechanism is designed to maintain the correct conjugate distances after their original establishment, as described, it is immaterial which actual place the lens occupies with relation to the lens-slide, so long as it derives its movement from the movement of the slide. It may thus be attached to any point of the slide, on the condition that when placed in the unit position, it will be at exactly double the focal distance from the object surface, the carrier for which latter can thus equally be attached to any point of the plate-carriage, so long as it derives its movement from the latter's movement.

The foregoing description of the construction and of the mode of operation of this mechanism, will be still better understood when observing that in Fig. 1, the elements 9ª, 11ª and 12ª, or respectively, the driving point of the lens-slide, the fulcrum and the driving point of the plate-carriage always form together a rectangular triangle whatever the position of the pivot 9ª may be, the imaginary line passing through the centers of the guides 11ª and 12ª, forming the base-line, which line is parallel to the bed 6. The centers of the guides 11ª and 12ª, form the ends of the hypotenuse, the center of the pivot 9ª being the apex and the center lines of the rods 11 and 12, being the rectangular sides. The apex being slidable in a line parallel to the hypotenuse, the perpendicular erected on the imaginary base-line 11ª, 12ª, through the apex 9ª, will at all times divide the distance between the centers of the guides 11ª and 12ª, in lengths to which the height of the apex, above the said base-line, is middle proportionate, in accordance with the well known geometrical theorem, that in a rectangular triangle the perpendicular on the hypotenuse passing through the intersection of the rectangular sides, divides the hypotenuse in sections which are respectively directly and inversely proportionate to the length of such perpendicular. The distance between the centers of the guides 11ª and 12ª will vary, in accordance with the position of the driving point 9ª of the lens-slide, and may thus always be considered as being composed of two parts, divided by the projection of the center of the pivot 9ª, on the imaginary base-line 11ª, 12ª, one part being the horizontal projection of the rod 11 on the line 11ª, 12ª, the other part being the horizontal projection of the rod 12 on the same line, so that the sum of these two horizontal projections constitutes at all times the entire distance between the centers of the guides 11ª and 12ª.

Although the mechanism as described and illustrated is of preferred construction, it is nevertheless obvious that it may be modified to suit different purposes without thereby departing from the nature as well as scope of my said invention, as defined by the claims.

Having thus described the nature and objects of my invention, what I claim as new and desire to secure by Letters Patent is:—

1. In a focusing apparatus, a frame, a lens-slide mounted on said frame, a plate-carriage mounted on said frame, means to impart movement to said slide, means also to impart relative movement to said plate-carriage, said means being pivotally connected to each of said two last-named members at a fixed driving point or axis on each and being adapted to automatically maintain the distance between the projections of the driving points of said slide and carriage on a line parallel to the frame always equal to the length of one of the conjugate-foci, minus the focus.

2. In a focusing apparatus, a frame carrying a fulcrum for a sliding-rod, a lens-slide and a plate-carriage movable on said frame, means to impart movement to said lens-slide, means also to impart relative movement to said plate-carriage, said means being pivotally connected to each of said two last-named members at a fixed driving point or axis on each and being adapted to automatically maintain the distance between said fulcrum and the projection of the driving point on said lens-slide on a line passing through the center of said fulcrum parallel to the frame always equal to the length of one of the conjugate-foci, minus the focus.

3. In a focusing apparatus, a frame carrying a fulcrum for a slide-rod, a lens-slide and a plate-carriage adapted to move along said frame, means to impart movement to said lens-slide, means also to impart relative movement to said plate-carriage, said means being pivotally connected to each of said two last-named members at a fixed driving point or axis on each and being adapted to automatically maintain the distance between said fulcrum and the projection of the driving point on the lens-slide on a line passing through the center of said fulcrum parallel to the frame always equal to the length of one of the conjugate-foci, minus the focus, and to automatically maintain the corresponding distance between similar projections of the driving points on said lens-slide and plate-carriage always equal to the length of the other conjugate-focus, minus the focus.

4. In a focusing apparatus, a frame, a lens-slide carrying a pivot and a plate-carriage coöperating with said frame, a set of rods arranged at right angles to each other, rotatably suspended at the point of intersection of said rods on the pivot of said lens-slide, an oscillatory guide block pivoted on said frame, and an oscillatory guide block pivoted on said plate-carriage, each of said oscillatory guide blocks engaging one of said rods, to thereby control the relative movement of said lens-slide and plate-carriage.

5. In a focusing apparatus, a frame carrying a fulcrum, comprising an oscillatory guide block, a lens-slide carrying a laterally projecting pivot-pin, a plate-carriage having an oscillatory guide block, said lens-slide and plate-carriage adapted to travel along said frame, rods rotatably suspended on the pivot-pin of said lens-slide, said rods arranged at right angles to each other, and respectively engaging said oscillatory guide blocks, controlling thereby the relative movements of said lens-slide and plate-carriage, operating means, adapted when moved in one direction to shift the suspension point of said rods to cause the driving point of said lens-slide to continually approach said fulcrum and the driving point of said plate-carriage to first approach, and then to recede from said fulcrum and vice versa, upon reversing the direction of movement of said operating means, to maintain between the driving points of said lens-slide and plate-carriage, distances, the projections of which, on a line passing through said fulcrum, parallel to the frame, will always be conjugate to the corresponding distances between said fulcrum and the similar projections of the driving point of said lens-slide.

6. In a focusing apparatus, a frame having guide-ways, a lens-slide supporting a pivot and adapted to travel along said guide-ways, a lens-carrier operatively connected with said lens-slide, a plate-carriage adapted to travel along said frame, an object-carrier operatively connected with said plate-carriage, rods arranged at right angles with each other and operatively connected with the pivot of said lens-slide, plate-carriage and frame, and operating means adapted to shift the pivot of said rods by one continuous forward movement, or by one continuous backward movement, to cause said lens-slide and plate-carriage to move partly in the same direction, and then in opposite directions, or vice versa, through the entire range of their relative adjustments from maximum magnification to maximum reduction.

7. In a focusing apparatus, the combination of a frame, a lens-slide mounted on said frame, a plate-carriage also mounted on said frame, a condenser supported by said carriage, an illuminating device movably connected with said carriage, and operative connections between said lens-slide, plate-carriage and illuminating device, to cause the distance between the illuminating device and the condenser to decrease or to increase, in accordance with the increase or the decrease of the distance between said condenser and lens-slide.

In witness whereof, I have hereunto set my signature in the presence of the two subscribing witnesses hereto.

LODEWYK J. R. HOLST.

Witnesses:
THOMAS M. SMITH,
HELEN F. MILLER.